United States Patent
Bhardwaj et al.

(10) Patent No.: US 9,547,654 B2
(45) Date of Patent: Jan. 17, 2017

(54) TECHNOLOGY FOR MANAGING CLOUD STORAGE

(71) Applicant: Intel Corporation, Santa Clara, CA (US)

(72) Inventors: Rahul M. Bhardwaj, Bangalore (IN); Vishwa Hassan, Chandler, AZ (US); Thomas A. Mant, Folsom, CA (US); Christian D. Black, Folsom, CA (US); Jeffrey C. Sedayao, San Jose, CA (US); Terry H. Yoshii, West Sacramento, CA (US); Alex Nayshtut, Gan Yavne (IL); Michael S. Breton, Folsom, CA (US); Douglas P. Devetter, Cameron Park, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,453

(22) PCT Filed: Oct. 9, 2013

(86) PCT No.: PCT/US2013/064047
§ 371 (c)(1),
(2) Date: Dec. 26, 2013

(87) PCT Pub. No.: WO2015/053766
PCT Pub. Date: Apr. 16, 2015

(65) Prior Publication Data
US 2015/0248418 A1 Sep. 3, 2015

(51) Int. Cl.
*G06F 7/00* (2006.01)
*G06F 17/30* (2006.01)
*G06F 9/50* (2006.01)

(52) U.S. Cl.
CPC ....... *G06F 17/30082* (2013.01); *G06F 9/5022* (2013.01); *G06F 17/30864* (2013.01)

(58) Field of Classification Search
None
See application file for complete search history.

(56) References Cited

U.S. PATENT DOCUMENTS

| 5,560,003 A | 9/1996 | Nilsen et al. |
| 2007/0266037 A1* | 11/2007 | Terry ................. G06F 3/0607 |
| 2009/0049311 A1* | 2/2009 | Carlson ............... G06F 3/0623 |
| | | 713/193 |

(Continued)

OTHER PUBLICATIONS

International Search Report and Written Opinion Received for PCT Application No. PCT/US2013/064047, mailed Jun. 26, 2014, 13 pages.

(Continued)

*Primary Examiner* — Tuan A Pham
(74) *Attorney, Agent, or Firm* — Grossman, Tucker, Perreault & Pfleger, PLLC

(57) ABSTRACT

Described herein is technology for managing cloud storage. In particular, systems, devices and methods for managing cloud storage are described. In some embodiments, management of cloud storage may result in the designation of storage allocated to a first storage pool as obsolete, and the reallocation and/or reclamation of such storage to a second storage pool and/or a general cloud storage pool. Management may occur in accordance with one or more policies.

19 Claims, 4 Drawing Sheets

(56) References Cited

U.S. PATENT DOCUMENTS

| | | | |
|---|---|---|---|
| 2010/0333116 A1* | 12/2010 | Prahlad | G06F 17/3002 719/328 |
| 2011/0119748 A1 | 5/2011 | Edwards et al. | |
| 2011/0295999 A1 | 12/2011 | Ferris et al. | |
| 2012/0271870 A1* | 10/2012 | Patwardhan | G06F 17/30283 707/823 |
| 2012/0278580 A1* | 11/2012 | Malige | G06F 12/02 711/166 |
| 2013/0024424 A1 | 1/2013 | Prahlad et al. | |
| 2013/0227236 A1* | 8/2013 | Flynn | G11C 16/26 711/165 |
| 2013/0238575 A1* | 9/2013 | Amarendran | G06F 17/30221 707/694 |
| 2014/0082613 A1* | 3/2014 | Kundu | G06F 8/63 718/1 |
| 2014/0297781 A1* | 10/2014 | Brand | G06F 17/30174 709/216 |

OTHER PUBLICATIONS

Kesavan, et al.; "Practical Compute Capacity Management for Virtualized Data Centers"; IEEE Transactions on Cloud Computing, vol. 1, No. 1; Jan.-Jun. 2013, pp. 88-100.

* cited by examiner

TECHNOLOGY FOR MANAGING CLOUD STORAGE

FIELD

The present disclosure relates generally to systems, devices, and methods ("technology") for managing storage, and, more particularly, to technology for managing storage in a cloud computing environment.

BACKGROUND

Interest is increasing in the use of cloud computing to address the computing needs of corporations and other entities. Cloud computing may be understood as the use of hardware, infrastructure, storage, services, interfaces, combinations thereof and the like to deliver computing services such as software, infrastructure, and storage to a client over a network such as an enterprise network, a private network, or a public network such as the internet. In a hybrid cloud model, a corporation or other entity ("user") may implement a private (e.g., enterprise) cloud to provide software, storage, etc. to clients, and may utilize a third party cloud such as a public (internet) cloud, a community cloud, another private cloud, or a combination thereof to provide additional computing resources. In such instances, the user may allocate workloads to the third party cloud, e.g., on demand and/or when resources on the user's private cloud become depleted/scarce. The hybrid cloud model can be particularly useful in the case of storage, e.g., where data may be stored in cloud storage provided by one or more cloud storage providers.

Although useful, the hybrid cloud model can be costly and time consuming to manage, particularly in the case of cloud storage. Cloud storage providers often charge a fee per unit of storage that is allocated to a particular user. Cloud storage users may therefore be charged for storage that is not in use, or which is being used to store data or other information that is obsolete or otherwise not of interest. Users may consequently wish to actively manage cloud storage and the data stored therein so as to mitigate cost. Cloud storage providers may also wish to reclaim unused or unnecessary cloud storage from cloud storage users, so that such storage may be reallocated for more efficient use.

Several options exist for managing (e.g., reclaiming and/or reallocating) cloud storage. Although such options are functional, effective use of them may require monitoring and manual management by cloud storage users and/or providers. Indeed to prudently manage cloud storage, it may be necessary for a cloud storage user to know when cloud storage allocated to them will expire, and/or when information contained in such storage is not being used. This can entail cumbersome and logistically difficult manual monitoring, particularly if cloud storage is allocated to a user in association with numerous virtual machines.

Cloud autoscaling is one option for automatically scaling cloud resources to meet user demand. Although useful, cloud autoscaling options generally focus on the scaling of compute resources, not storage resources. For example, a cloud provider may provide one or more virtual machines (VMs) to a user, each of which may include an associated cloud storage allowance. In such instances, cloud autoscaling may automatically delete entire VMs from the resources provided to the user, e.g., as specified by a service level agreement (SLA) between the cloud provider and the user. While the VM's themselves may be deleted. VM images and associated storage may still be allocated to the user and maintained in the cloud. The user may therefore still be charged for the storage associated with the VM, even if it is no longer needed.

Figure 1:
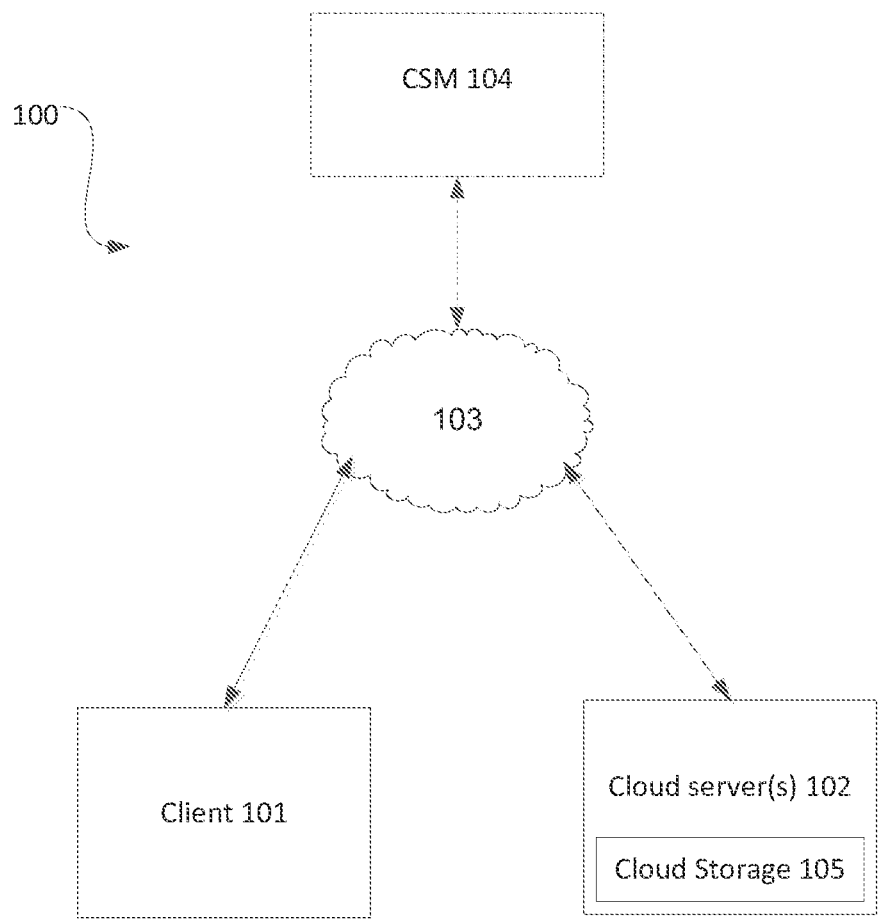
FIG. 1 is a block diagram of an exemplary system consistent with the present disclosure.

While the following Detailed Description will proceed with reference being made to illustrative embodiments, many alternatives, modifications, and variations thereof will be apparent to those skilled in the art.

DETAILED DESCRIPTION

As noted in the Background, several mechanisms exist for manually or automatically managing resources provided by a cloud provider. Although useful, manually management of cloud resources may be cumbersome and time consuming, and thus may be undesirable. Existing automatic mechanisms such as cloud autoscaling are also useful, but are generally focused on the management of cloud computing resources and not cloud storage. A need therefore remains in the art for improved mechanisms for managing cloud storage. The technologies described herein aim to address that need.

As will be described in detail below, the technologies of the present disclosure relate to devices, systems and methods for managing cloud storage. In general the technologies employ a policy based storage sweeping process which may be executed to identify "obsolete storage." Obsolete storage may be understood as cloud storage that is allocated to a cloud user and/or a virtual machine (VM), but which has expired (e.g., according to a service level agreement), is unused, is unnecessary (as defined by a service level agreement and/or storage management policy), and combinations thereof. The technologies described herein may permit management (i.e., reclamation and/or reallocation) of obsolete storage in accordance with the parameters of one or more policies. For example, obsolete storage allocated to a cloud user and/or VM may be automatically reallocated to another user, to another client of a user, and/or to another VM of a user, and combinations thereof. Alternatively or additionally, obsolete storage may be reclaimed by a cloud storage provider and added to the provider's general storage pool, e.g., as free space. In this way, the technologies described herein may allow cloud storage users and providers to dynamically, and/or automatically manage cloud storage in an efficient manner.

As used in this application and in the claims, a list of items joined by the term "and/or" can mean any combination of the listed items. For example, the phrase "A, B and/or C" can mean A; B; C; A and B; A and C; B and C; or A, B and C.

The terms "client device" and "client" are interchangeably used herein to refer to a computing device that may be used to access resources provided by a cloud resource provider, e.g., cloud storage. Any type of mobile or other electronic device may be used as a client consistent with the present disclosure, provided that it has the capability to communicate with or otherwise access cloud resources.

Non-limiting examples of such devices include mobile and/or non-mobile devices such as cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Such devices may be portable or stationary. Without limitation, the client devices described herein are preferably in the form of one or more cell phones, desktop computers, laptop computers, servers, smart phones and tablet personal computers.

The term "cloud storage" is used herein to refer to one or more pools of storage that may be hosted by a cloud storage provider (e.g., a third party computing system such as a data center, one or more servers, etc.) for the storage of user (e.g., client) data. Cloud storage may be configured to provide a general pool of storage to a user, which may be virtualized according to the user's requirements, e.g., as specified in a service level agreement (SLA). The cloud storage provider may then expose the storage to the user as one or more storage pool(s), which the user may use to store files and/or data objects. Physically, cloud storage may be provided by one or more mass storage devices (e.g., hard drives, tapes, solid state memory, combinations thereof, etc.), which may be distributed on one or more cloud servers that are geographically co-located and/or distributed.

As used herein, the term "manage" when used in association with cloud storage (e.g., "manage cloud storage") refers to processes by which cloud storage may be reallocated, reclaimed, or otherwise altered or modified.

As used herein the term "module" may refer to software, firmware, circuitry, and combinations thereof, which may be configured to perform one or more operations consistent with the present disclosure. Software may be embodied as a software package, code, instructions, instruction sets and/or data recorded on one or more non-transitory computer readable storage mediums. Firmware may be embodied as code, instructions or instruction sets and/or data that are hard-coded in (e.g., nonvolatile) memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules described herein may collectively or individually be embodied as circuitry that forms a part of a client device, a cloud storage device/system, and/or a cloud storage management device/system. For the sake of clarity, modules may be described herein in the context of their functionality. In such instances, it may be understood that such a module may be independently capable of performing the recited functionality, and/or may cause all or a portion of host computing system (e.g., a processor) executing the module to perform the stated functions.

As used herein, the term "service level agreement" (SLA) refers to an agreement between a user (e.g., client) and a cloud storage provider that specifies the general terms of service between the parties. For example, an SLA may specify that the cloud storage provider will provide a general pool of cloud storage of a specified capacity to a user. In some embodiments, an SLA may specify maximum and/or minimum storage amounts that are to be maintained by the cloud storage provider and allocated to the user.

Although cloud storage may be virtualized as a single large storage pool which may be accessed by a user, client(s) of a user, and/or virtual machines allocated to a user, such virtualization is not required. Indeed, cloud storage may be virtualized in any manner that is suitable to a user, and which may be specified in an SLA. For example, an SLA between a cloud storage user and provider may specify that cloud storage is to be virtualized among one or more clients and/or virtual machines (VMs). The SLA in some embodiments may specify one or more "flavors" of VM's, wherein each flavor may be allocated a particular amount of cloud storage. For example, the SLA may specify that all VMs of a first flavor have a specific (e.g., first) amount of allocated cloud storage, whereas VMs of a second flavor have another specific (e.g., second) amount of allocated cloud storage. Of course, the number of flavors is not limited to two, and SLAs specifying any number of flavors and associated storage amounts are envisioned by the present disclosure. Still further, an SLA may further specify storage limits for each virtual machine, e.g., a maximum and/or minimum available storage (volume allocation) for each VM, a maximum and/or minimum free storage (buffer) for each VM, combinations thereof, and the like.

Of course, an SLA may specify other parameters governing the service provided by a cloud storage provider to a user. For example, an SLA may include parameters requiring a specified degree of uptime, latency requirements, notice requirements (e.g., for maintenance), backup services, number of replicas, geographic locations, post install configurations specified by a cloud storage user, combinations thereof, and the like.

In contrast to an SLA, the terms "storage management policy" and "SMP" are interchangeably used herein to refer to one or more policies that include parameters for managing the cloud storage allocated by a cloud storage provider to a user. As will be described in detail below, parameters of an SMP may permit a user and/or cloud storage provider to manage cloud storage allocated to the user under an SLA. By way of example, an SMP may allow storage allocated to a user under an SLA to be permanently or temporarily reclaimed by a cloud storage provider in the event that such storage is determined to be obsolete, e.g., by applying factors in the SMP and/or SLA. Alternatively or additionally, obsolete storage may be reallocated among users, clients, and/or virtual machines.

By way of example, an SLA may specify that a cloud storage provider is to allocate a first amount of storage, e.g., 100 gigabytes (GB) or some other amount, to a user, a client or a user, and/or one or more virtual machines. In such instances, an SMP may include one or more parameters that permit management of all or a portion of the first amount of storage in certain specified circumstances. In one exemplary embodiment, the SMP may include parameters permitting management of all or a portion of the first amount of storage if the entirety or relevant portion of the first amount of storage is unused by the relevant user, client and/or virtual machine.

For example, parameters of an SMP may permit management of cloud storage allocated to a user, client, and/or VM if a predetermined amount of such storage is unused (i.e., if a free storage allocation threshold size set in an SMP is exceeded). For example, an SMP may include parameters that designate free "(i.e. unused) storage exceeding a free storage allocation threshold as obsolete, and thus available for management. By way of example, parameters of an SMP may set a free storage allocation threshold of 50 GB (gigabytes). If 100 GB of cloud storage is initially allocated to a client and 70 GB of that storage is unused, the SMP parameters may designate all of a portion of the cloud storage allocated to the client (e.g., the free storage) as obsolete and available for management.

An SMP may further include parameters specifying the maintenance of a certain level of service/storage after reclamation and/or reallocation. For example, an SMP may include parameters requiring a certain (e.g. minimum) amount of free space (hereinafter, a free storage buffer) to be maintained within storage allocated to a user, client, virtual machine, or combination thereof under an SLA. The free storage buffer may be any amount that is suitable to the relevant user, client, and/or virtual machine. For example, the free storage buffer may range from greater than 0 to less than 100% of the cloud storage allocated to a user, client, and/or virtual machine, as appropriate. Without limitation the free storage buffer is preferably set so as to provide adequate free cloud storage to service a user, client, and/or VM's immediate needs, but which is not so large as to incur unnecessary expense to the user and/or to amount to an inefficient allocation of the cloud storage provider's storage resources. Thus for example, the free storage buffer may range from about 90% to about 5% of a first amount of storage allocated to a user, client, and/or virtual machine, such as about 80% to about 10%, about 70% to about 10%, about 60% to about 10%, about 50% to about 10%, or even about 20% to about 10% of the first amount of storage.

An SLA may for example cause a cloud storage provider to allocate 100 GB to a client, and may set a free storage buffer of 10 GB for that client. Parameters of an SMP may specify that if the amount of free storage that is allocated to the client exceeds the free storage buffer (for the sake of this example, 10 GB), the free storage exceeding the free storage buffer may be designated obsolete and available for management. Thus, if 50 GB of the 100 GB allocated to the client is used, application of the SMP parameters may cause 40 GB of the unused (free) storage to be designated obsolete and thus available for management.

Factors in an SMP may also permit management of all or a portion of a first amount of storage in the event that such storage has "expired" under the terms of an SLA. For example, an SLA between a user and a cloud storage provider may specify that cloud storage provider is to provide a first amount of storage to the user (and its clients/virtual machines) for a specified time period. e.g., a period of minutes, hours, days, months, years, etc.). Data storage that has exceeded the specified time period may be considered "expired storage."

In some instances the SLA (and/or policies of the cloud storage provider) may require the cloud storage provider to maintain data stored in the allocated storage beyond the time period specified in the SLA. While such terms may be advantageous in the sense that the user's data may be retained, it could result in additional charges and/or other complications for the user, particularly in instances where all or a portion of the user's data is not needed or wanted. These disadvantages may be mitigated or even avoided by using an SMP that includes factors that designate all or a portion of expired storage as obsolete and thus available for management in accordance with the present disclosure.

Data stored in cloud storage may include one or more indicator flags, e.g., in the form of one or more bits, metadata, combinations thereof, and the like. Such flags may serve as an indicator of the relative importance of the data and hence, the underlying storage. For example, indicator flags may be set to specify that certain data is of high importance, whereas other data is of moderate and/or low importance. In such instances, factors in an SMP may permit reallocation and/or reclamation of storage that is occupied by data that bears no indicator, or which bears an indicator that is designated in the SMP as being suitable for management. For example, one or more parameters of an SMP may specify that storage containing data bearing an indicator signifying that the data is of low importance may be reallocated and/or reclaimed, whereas storage containing data bearing an indicator of moderate or high importance should not be reallocated and/or reclaimed. Similar indicators may be used to designate data (and hence, underlying storage) as obsolete and thus available for management.

Alternatively or additionally, data stored in cloud storage may also include metadata or other information that is pertinent to the relative use of such data and hence, whether the underlying storage is obsolete (and thus suitable for reclamation and/or reallocation). For example metadata or other information may specify when data (e.g., files, objects) in cloud storage has last been used (e.g., accessed, modified, combinations thereof, and the like), the frequency with which such data has been used, and combinations thereof. In such instances, factors in an SMP may indicate that cloud storage containing data having certain usage characteristics is obsolete and thus available for management in accordance with the present disclosure.

For example, an SMP may include parameters which if met may indicate that storage is obsolete if it contains data that has not been used after a specified time period (e.g., days, weeks, months, years, etc.). In other words, factors of an SMP may specify a minimum dormant usage threshold. Storage containing data that exceeds the minimum dormant usage threshold (i.e., which has been dormant/not accessed) within a threshold time period may be designated by the SMP as obsolete and thus suitable for reallocation and/or reclamation. As previously noted, the minimum dormant usage threshold may range from days, weeks, months, or even years. Whether or not data meets or exceeds the minimum dormant usage threshold may be determined for example by inspection of metadata or other information reflecting the usage of the data in question.

An SMP may further include parameters which if met may indicate that storage is obsolete if it contains data that is only infrequently accessed. In other words, an SMP may set a threshold access limit. Storage containing data that does not meet the threshold access limit (e.g., which has not been accessed/used a specified number of times) may be designated by the SMP as obsolete and thus suitable for reallocation and/or reclamation. The threshold access limit may be set by the user and/or cloud storage provider, and may be any suitable number of accesses. For example, the threshold access limit may be greater than 0, greater than or equal to about 5, greater than or equal to about 10, greater than or equal to about 25, greater than or equal to about 100, or even greater than or equal to about 1000. The threshold access limit may also be time dependent. That is, the threshold access limit may specify a minimum number of accesses/uses in a certain time period, e.g., minutes, hours, days, months, years, etc. For example, the threshold access limit may require the aforementioned access amounts to occur within about 1 hour, about 1 day, about 1 week, about 1 month, about 1 year, or within some other specified time range.

An SMP may be further configured such that cloud storage allocated to a user is designated as obsolete based upon the evaluation of a combination of parameters, such as those specified above. For example, an SMP may designate storage as obsolete and thus suitable for management if the storage contains data that fails to meet a combination of a minimum access threshold and minimum dormant usage threshold. Alternatively or additionally, an SMP may designate storage as obsolete and suitable for management if it contains data bearing an indicator of low importance, and which has not met a specified threshold access limit and/or or minimum dormant usage threshold.

An SMP may further specify a control hierarchy in which the importance of certain parameters may be prioritized over other parameters in the SMP. For example, an SMP may prioritize parameters requiring compliance with factors of an SLA, data importance, etc. over other parameters such as minimum dormant usage threshold and/or threshold access limit. Thus for example, an SMP may be configured such that storage may not be designated as obsolete and suitable for management if data contained in that storage is designated as important and/or reclamation/reallocation would result in non-compliance with the terms of an SLA. Likewise, if data is designated as important (e.g., with an indicator flag), management of storage containing that data may not be permitted, even if the data fails to meet a minimum dormant access limit and/or threshold access limit. This may be balanced against other factors such as the scarcity of resources available to particular users, clients, VM's and combinations thereof, as well as the needs of any one or combination of such users, clients, and VMs. For example, an SMP may permit management of storage (even storage containing important data) in instances where storage allocated to another, higher priority user is scarce. For example, an SMP may permit the management of storage containing important data allocated to a relatively low priority VM in instances where free storage allocated to a relatively high priority VM has become scarce (e.g., less than or equal to about 10%, 5%, or even about 1% of the storage allocated to the high priority VM is free). Likewise, management of storage containing important data may also be permitted by an SMP in instances where a cost threshold is exceeded.

An SMP may also be aware of the terms of an SLA relevant to the storage under consideration, and may include factors which may designate storage as suitable for management based upon an evaluation of the terms of the SLA. For example, an SMP may be configured such that it is aware of data usage charges imposed under an SLA on a relevant user for the data under consideration. In such instances, an SMP may be capable of determining cost savings and/or other benefits which may accrue to a user in the event that the storage under consideration is designated as obsolete and reallocated and/or reclaimed. In some instances, the SMP may include a cost savings threshold, wherein storage under consideration may be designated as obsolete and suitable for management if the cost savings threshold is met. The cost savings threshold may be set in any suitable manner, and may correlate to a specified monetary value, a specified percentage of savings (i.e., a monetary savings relative to the total cost of the cloud storage allocated to a pertinent user, client, and/or virtual machine), combinations thereof, and the like. In some instances, an SMP may not designate data (and underlying storage) under consideration as obsolete if the cost savings threshold is not met. In other words, the cost savings threshold may be employed in a control hierarchy within the SMP and may control whether data is designated as obsolete and, thus, whether the underlying storage is available for management. In such instances, the SMP may be further configured to communicate the potential cost savings that would result from managing obsolete storage in a proposed manner to a user, in which case management of the storage may be contingent on the receipt of an affirmation from the user that management is to proceed.

In any case, all or a portion of cloud storage designated as obsolete by application of the parameters of the SMP may be managed in accordance with the present disclosure. For example, all or a portion of obsolete storage may be reallocated from a first user, client and/or virtual machine to at least one other user, client, and/or virtual machine. Alternatively or additionally, all or a portion of the obsolete free storage may be reclaimed by a cloud storage provider from a first user, client and/or virtual machine, in which case it may be reallocated to the general storage pool (free space) available for allocation by the cloud storage provider.

One aspect of the present disclosure relates to a cloud storage management system. Reference is therefore made to FIG. 1, which depicts exemplary system architecture of a cloud storage management system consistent with the present disclosure. As shown, cloud storage management system 100 (hereafter, system 100) includes client 101, cloud server(s) 102, and optional cloud storage manager (CSM) 104, which may communicate with one another over network 103. Among other things, cloud server(s) 102 include cloud storage 105.

Client 101 may be any type of client device as defined above, and may be independent or part of public, community, or private cloud. For example, client 101 may be a computing terminal or other client device that is part of a private cloud, such as a corporate (enterprise) cloud. Alternatively or additionally, client 101 may be a standalone device. Without limitation, client 101 is preferably a computing terminal, a laptop computer, a desktop computer, a tablet personal computer, a smart phone, or a mobile device that is part of a private (e.g., corporate) cloud.

Client 101 may be configured to communicate with cloud server(s) 102 and optional CSM 104 via network 103. For example, client 101 may, via network 103, transfer or otherwise communicate data (e.g., files, data objects, etc.) and other resources to cloud server(s) 102 for storage in cloud storage 105. Client 101 may thereof include communications circuitry (not shown), which may be any type of circuitry that is that is capable of sending and receiving information from and with client 101. For example, client 101 may include an antenna, a transmitter, a receiver, a transceiver, a transponder, a network interface device (e.g., a network interface card), combinations thereof, and the like. Accordingly, client 101 may be capable of sending and/or receiving data signals using one or more wired or wireless communications protocols using close/long range communication, as may be used with a close/long range communications network.

The phrase "close range communication" is used herein to refer to one or more technologies for sending/receiving data signals between devices that are relatively close to one another. Close range communication may occur over a close range communication network, such as but not limited to a BLUETOOTH™ network, a personal area network (PAN), near field communication (NFC), a ZigBee network, a wired Ethernet connection, combinations thereof, and the like. In contrast, the phrase "long range communication network" is used herein to refer to technologies for sending/receiving data signals between devices that are a significant distance away from one another. Long range communication occurs over a long range communication network, such as but not limited to a WiFi network, a wide area network (WAN)

(including but not limited to a cell phone network (3G, 4G, etc. and the like), the internet, telephony networks, combinations thereof, and the like.

Network 103 may be any network that carries data. For example, network 103 may be a close range network, a long range network, or a combination thereof. Examples of such networks include the internet, private networks, virtual private networks (VPN), public switch telephone networks (PSTN), integrated services digital networks (ISDN), digital subscriber link networks (DSL), wireless data networks (e.g., cellular phone networks, wireless local area networks, and the like), BLUETOOTH networks, near field communication networks, ZigBee networks, a local area network (LAN), a cellular phone network (3G, 4G, etc.), combinations thereof, and the like. Without limitation, network 102 is preferably the internet.

Client 101 may further include processing resources and memory resources (both not shown). Processing resources of client 101 may include one or more general purpose processors and/or application specific integrated circuits, which may be capable of executing one or more processing threads. In generally, such processing resources are configured to execute software, firmware and the like stored on memory resources of client 101. For example, processing resources of client 101 may execute software such as an operating system stored in memory resources of client 101. Alternatively or additionally, processing resources of client 101 may execute one or more modules that may function to provide an interface on client 101 to facilitate interaction with cloud server(s) 102 and/or cloud storage 105. Optional client user interface (UI) module 207 (shown in FIG. 2) is one example of such a module, and when executed may provide an interface through which client 101 may interact with and/or manage cloud storage 105, an optional registration module 208, a policy enforcement module 205 and/or a storage management module 201, as described later.

Memory resources of client 101 may include one or more mass storage devices or other memory devices within or directly coupled to client 101. Examples of such memory resources include but are not limited to the following memory types: read only memory, electrically programmable memory, random access memory, flash memory (which may include, for example, NAND or NOR type memory structures), magnetic disk memory, and/or optical disk memory. Additionally or alternatively, memory resources on client 101 may include other and/or later-developed types of computer-readable memory.

Cloud server(s) 102 may be in the form of one or more cloud (e.g., internet, enterprise, community, etc.) servers that include mass storage or other memory devices that may be leveraged as cloud storage 105. In operation, cloud servers 102 may function to allocate cloud storage 105 as one or more virtualized data storage pools to one or more users such as client 101. e.g., in accordance with an SLA between a user and a cloud storage provider as discussed previously. Cloud servers 102 and/or cloud storage 105 may be also configured to send and/or receive data to/from client 101. For example, cloud server(s) 102 may be configured to receive information (e.g., files and/or data objects) from client 101 and to store such information in cloud storage 105. Storage of such information may be in accordance with a service level agreement, a storage management policy, or a combination thereof.

Cloud server(s) 102 may also include processing resources and memory resources, which may be the same or different form the processing and memory resources described above in connection with client 101. In some embodiments the processing resources of cloud server(s) 102 may be configured to host and/or execute a storage management module (SMM) (and/or computer readable instructions thereof), which may function to analyze cloud storage 105 to determine usage data, report usage data to a policy enforcement module, to execute storage reclamation and/or reallocation operations consistent with the present disclosure, and/or a combination thereof. Cloud server(s) 102 may further include at least one interface such as a web-based user interface, a web service application programming interface (API), a cloud storage gateway or a combination thereof. Such interface(s) may be configured to enable client 101 access, configure, and/or manage cloud storage 105.

Cloud storage 105 may be in the form of one of more storage devices, which may be provided on a single cloud server or multiple servers, as described above. In general, cloud storage 105 may include any type of storage (e.g., magnetic, optical, magneto-optical, static (e.g., flash), and/or read only memory, etc.) that is capable of storing digital information received from client 101. Data may be stored on cloud storage 105 in any suitable format, such as in a file system format, an object-based format, or a combination thereof. Without limitation, cloud storage 105 is preferably configured to store data in an object-base format. In such instances, cloud storage 105 may include one or more object-based storage devices (OSD's).

In some embodiments, system 100 may include an optional cloud storage manager (CSM), such as CSM 104. Generally, optional CSM 104 may be understood as an optional device/system which may function to manage cloud storage 105 in accordance with one or more storage management policies. For example, optional CSM 104 may be configured to perform policy enforcement operations and/or to instigate scheduling, storage analysis (sweeping), and/or cloud storage reclamation/reallocation operations consistent with the present disclosure. CSM 104 may be owned and/or operated by client 101, a cloud storage provider, a third party cloud storage management service, or a combination thereof.

Client 101, cloud server(s) 102, and/or optional CSM 104 may host or otherwise store one or more modules thereon which may function individually or in combination to provide a mechanism for managing cloud storage 105. In particular, modules on client 101, cloud server(s) 102, and/or optional CSM 104 may function individually or in combination to perform cloud storage management functions on data pools of cloud storage consistent with the present disclosure. Examples of cloud storage management functions include but are not limited to scheduling operations, storage analysis (sweeping) operations, policy enforcement operations, reclamation operations, and/or reallocation operations.

Figure 2:
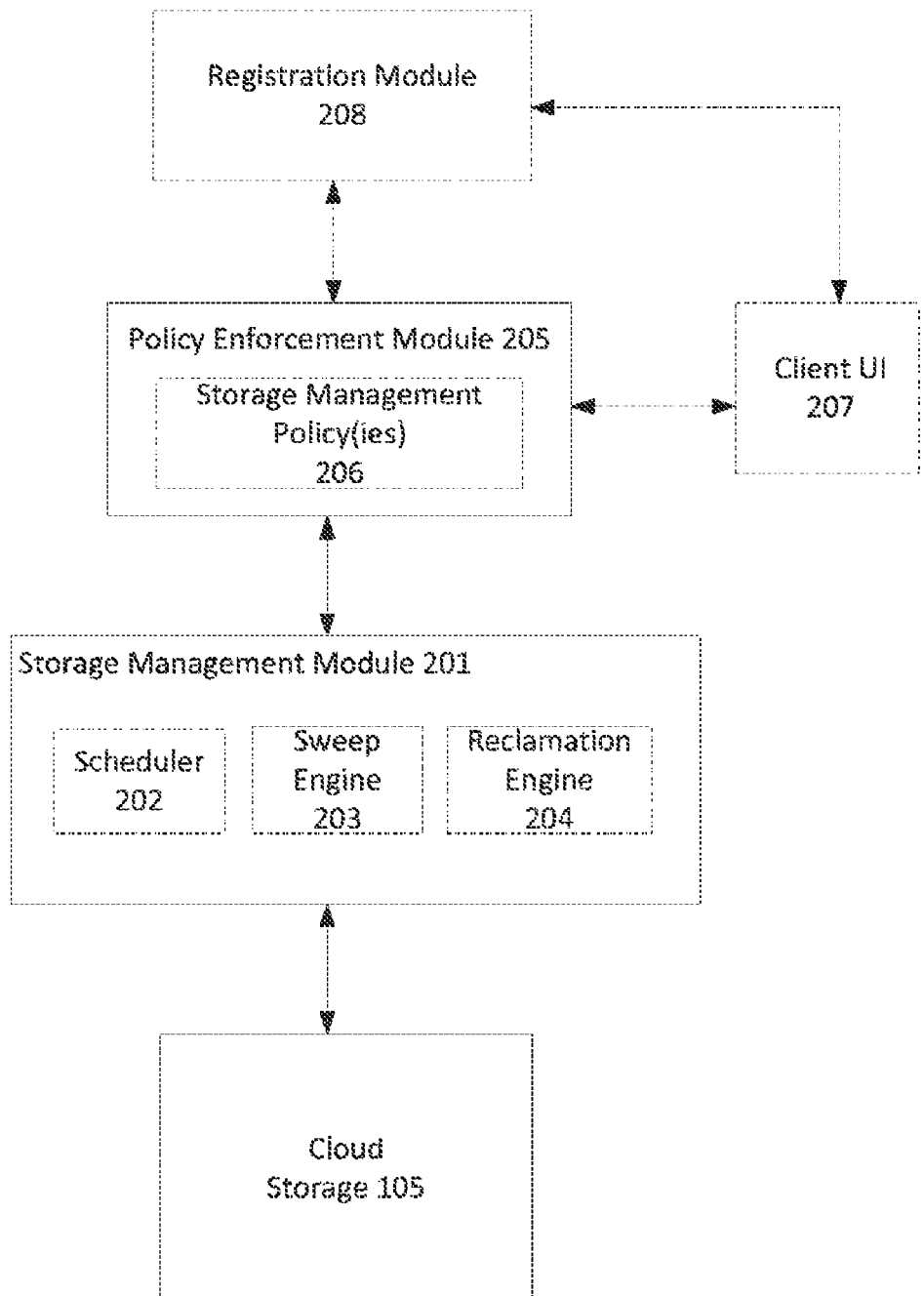
FIG. 2 depicts exemplary modules which may be included in a system in accordance with the present disclosure.

Reference is now made to FIG. 2, which is a block diagram of various modules that may be used in the technologies of the present disclosure. For the sake of illustration, embodiments are described herein wherein certain modules are present and executed on certain devices, such as client 101, server(s) 102, and/or CSM 104. It should be understood that such embodiments are exemplary, and that the modules described herein may be hosted and executed on any suitable device.

As shown in FIG. 2, the technologies of the present disclosure may include storage management module (SMM) 201 and policy enforcement module (PEM) 205. In general, SMM 201 may function to manage the timing and execution of analysis "sweeps" of cloud storage 105, as well as the management (i.e., reclamation and/or reallocation) of storage provided by cloud storage 105, e.g., to client 101 of FIG. 1. While SMM 201 may be configured as a single module for performing these functions as shown in FIG. 2, such configuration is not required. Indeed. SMM 201 may be configured as or may include multiple different modules. This concept is illustrated in FIG. 2 by the hashing of the boxes surrounding scheduler module 202, sweep engine module 203, and reclamation engine module 204. It should also be understood that those modules need not be components of another module, and may be separate from SMM 201. Without limitation. SMM 201 preferably includes scheduler module 202, sweep engine module 203, and reclamation engine module 204, and is preferably hosted and/or executed within the context of one or more cloud server(s) 102 and/or one or more virtual machines provided by such server(s). Alternatively or additionally, SMM 201 and any or all of its components may be hosted on and executed by optional CSM 104.

In some embodiments, cloud server(s) 102 may be configured to provide cloud storage 105 to client 101 in association with one or more virtual machines, wherein each virtual machine may be allocated a portion of the total storage pool allocated to a user or a client of a user. Such configuration may be specified for example by an SLA between a user and a cloud storage provider. In any case, SMM 201 may be configured as a software module which may be executed within the context of each virtual machine provided by cloud sever(s) 102. Alternatively or additionally, SMM 201 may be incorporated into or be in the form of a hypervisor (virtual machine monitor), in which case it may operate to perform cloud storage management operations on data storage pools allocated to one or more virtual machines under its purview.

Scheduler module 202 may be integral to or separate from SMM 201, and may be configured to coordinate the timing and execution of analysis sweeps of cloud storage 105 by sweep engine module 203. For example, scheduler module 202 may be configured to schedule the performance of analysis sweeps on cloud storage 105, such that sweeps occur at a specified time, according to a schedule, at periodic intervals, and/or on demand from a user/administrator (e.g., in response to sweep instigation commands received from client UI module 207). The timing and execution of analysis sweeps may be specified in one or more storage management policies, which may be resident within scheduler module 202, policy enforcement module 205 (e.g., within storage management policies 206), or at another suitable location.

In some embodiments, scheduler module 202 may be configurable, e.g., by policy enforcement module (PEM) 205 and/or with user inputs received, e.g., from optional client UI 207. For example, PEM 205 may include storage management policy(ies) 206, any or all of which may include parameters specifying the execution of storage sweeps at particular times, according to a schedule, etc. In such instances, policy enforcement module 205 when executed by a processor of a computing device (e.g., cloud server(s) 102) may cause the computing device to configure scheduler module 202 accordingly.

For example, where scheduler module 202 and PEM 205 are hosted and executed on the same computing device, PEM 205 may cause the computing device to configure scheduler module 202 to instigate the performance of analysis sweep in accordance with parameters in storage management policy(ies) 206. Alternatively or additionally, where scheduler module 202 is resident on a first computing device (e.g., optional CSM 104) and PEM 205 is resident on a second computing device (e.g., cloud server(s) 102), PEM 205 when executed may cause the second computing device to send scheduling signals to the first computing device, in response to which the first computing device may configure scheduler module 202 appropriately.

As used herein, the term "analysis sweep" and "sweep" are interchangeably used to refer to one or more operations in which sweep engine module may scan and collect usage data from cloud storage 105. Usage data may include data relevant to an applicable storage management policy. For example, usage data may include one of more of information regarding: the total amount of storage available in a storage pool allocated to a user, client and/or virtual machine; the total amount of free storage available in such storage pool; the amount of occupied storage in such storage pool; metadata relevant to the use and/or importance of files and/or data objects stored in such storage pool such as the last access date, last modification date, number of accesses/uses (optionally over a specified time period), etc. of such files and objects), the author/originator of such files/objects, an indicator of a file/object's relative degree of importance (high, low, etc.), the cost of the storage under consideration, combinations thereof, and the like.

In any case, when an analysis sweep is to be performed scheduler module 202 may communicate or may cause PEM 205 to communicate sweep instigation messages to sweep engine module 202. In the former case, scheduler module 202 may be aware of parameters included in storage management policies 206 within PEM 205, and may include the identity of such parameters in sweep instigation messages to sweep engine module 203. In the latter case, the sweep instigation messages may identify the storage pool under consideration by host, client, and/or virtual machine to PEM 205. In response to such messages, PEM 205 may analyze storage management policy(ies) 206 to determine which policies apply to the relevant storage pool, and what parameters are specified in such policy(ies). PEM 205 may then communicate a sweep instigation message including the identity of those parameters to sweep engine 203. In sum, scheduler 202 and/or policy enforcement module 205 may inform sweep engine 203 of the parameters included in the relevant storage management policy, which sweep engine module 203 may use to tailor its analysis sweep accordingly.

In response to a sweep instigation message, sweep engine module 203 may perform an analysis sweep on cloud storage 105. As noted above, the sweep instigation messages may in some instances instruct sweep engine 203 to sweep cloud storage 105 for usage information relevant to one or more storage management policies, such as storage management policies 206. For example, where storage management policies 206 include parameters that permit/deny reclamation and/or reallocation of storage based a minimum dormant access limit, threshold access limit, and data importance indicator (flag), sweep instigation messages from scheduler 202 and/or policy enforcement module 205 may cause sweep engine module 203 to perform an analysis sweep on cloud storage 205 for usage data relevant to such parameters.

Analysis sweeps of cloud storage 105 may be performed in any suitable manner. For example, sweep engine 205 may obtain file system allocations, file properties, and other file system metadata. As another example, sweep engine 205 may also obtain metadata associated with object storage allocation. Sweep engine 205 may obtain this information from APIs provided by Cloud Storage providers or directly from VMs, either through APIs or by logging into them.

Sweep engine module 203 may be configured to perform and/or instigate the performance of analysis sweep operations and reporting operations consistent with the present disclosure. In this regard, sweep engine module 203 may be configured to perform or instigate the performance of analysis sweeps on cloud storage 105 on a per host basis (e.g., on all data storage pools provided by a particular cloud storage host/provider), on a per server basis (e.g., on all data storage pools provided by a particular cloud server 102), and/or on a per storage pool basis (e.g., on one or more storage pools allocated to a particular user, client, and/or virtual machine by a cloud server 102).

When cloud server(s) 102 is/are configured to provide cloud storage 105 to a cloud storage user such as client 101 in association with one or more virtual machines, each virtual machine may be allocated a portion of a total storage pool allocated to a cloud storage user. In such instances, sweep engine module 203 may be configured to perform analysis sweeps on a per virtual machine basis, i.e., on the portion of the total storage pool that is allocated to a particular virtual machine or set of virtual machines. Moreover, sweep engine module 203 may be configured as a software module for execution within the context of a virtual machine and/or as part of a hypervisor (virtual machine monitor) overseeing one of more virtual machine(s) provided by cloud server(s) 102.

In any case, sweep engine module 203 may be further configured to communicate usage data regarding cloud storage 105, e.g., to policy enforcement module 205, the functions of which will be described later. For example, sweep engine module 203 when executed by a processor of a computing device may cause the computing device to transmit usage information signals to policy enforcement module 205. The usage information signals may include for example: the total amount of cloud storage 105 allocated by cloud storage 105; the total amount of free space in cloud storage 105, the total amount of used storage in cloud storage 105, usage data for files and/or data objects stored in cloud storage 105, the cost of free/used storage in cloud storage 105, the relative scarcity of free storage of cloud storage 105 allocated to a particular user/client/VM, combinations thereof, and the like, any or all of which may be optionally broken out by user, client and/or virtual machine.

Reclamation engine module 204 may be configured to manage cloud storage 105. i.e., to perform storage reclamation and/or reallocation operations consistent with the present disclosure. For example reclamation engine 204 may, in response to a storage management command from policy enforcement module 205, cause cloud server(s) 102 to manage (e.g., reclaim and/or reallocate) storage in accordance with one or more storage management policy(ies) 206 of PEM 205. Performance of such operations may be accomplished in any suitable manner.

For example, reclamation engine 204 may perform storage reclamation and/or reallocation operations on a per user basis, e.g., on the total storage pool allocated to a particular cloud storage user. Alternatively or additionally, reclamation engine 204 may perform storage reclamation and/or reallocation operations on a per client basis, e.g., on a subset of the total data storage pool which is allocated to a particular client of a cloud storage user. In still other embodiments, cloud server(s) 102 may be configured to provide cloud storage 105 to client 101 in association with one or more virtual machines, in which each virtual machine may be allocated a portion of the total storage pool allocated to a cloud storage user. In such instances, reclamation engine 204 may perform storage reclamation and/or reallocation operations on a per virtual machine basis (e.g., on the portion of the total storage pool that is allocated to a particular virtual machine or set of virtual machines).

Reallocation operations consistent with the present disclosure may involve the designation of all or a portion of a first amount of cloud storage allocated to a first user, client and/or virtual machine as obsolete. All or part of storage so designated may be de-allocated from the first user, client and/or virtual machine and reallocated to a second user, client and/or virtual machine. The manner in which reallocation operations are performed may be specified by user input (e.g., through optional client UI 207), an SLA and/or an SMP. For example, an SMP may include parameters dictating when storage allocated to a first user/client/VM is obsolete and thus suitable for management (e.g., reallocation and/or reclamation as discussed above), and may further include parameters specifying one or more second users/clients/VMs to whom all or a part of the obsolete portion should be reallocated. Alternatively or additionally, reallocation operations performed by reclamation engine 204 may be guided by policy enforcement module 205, which may be aware of the storage status of other (second) users, clients and/or virtual machines, and which may prioritize reallocation of cloud storage amongst such entities. Still further, reallocation operations may be guided by inputs may through client UI 207.

In some embodiments, reclamation engine 204 may in response to storage management commands from policy enforcement module 205 cause cloud server(s) 102 to de-allocate all or a portion of cloud storage 105 that is allocated to a first user, client and/or virtual machine. Based user inputs (e.g. through client UI 207) and/or on factors known to reclamation engine 204 and/or policy enforcement module 205, reclamation engine 204 may reallocate the de-allocated portion of the cloud storage to a second user, client and/or virtual machine. As a result, cloud storage allocated to the second user, client and/or virtual machine may increase by the amount of storage de-allocated from the first user, client and/or virtual machine. Similar operations could be performed based on user inputs made through optional client UI 207.

Reclamation operations consistent with the present disclosure may involve the designation of all or a portion of a first amount of cloud storage allocated to a first user, client and/or virtual machine as obsolete. In such instances, the all or a party of the obsolete storage may be de-allocated from the first user, client and/or virtual machine, and reallocated to (reclaimed by) the general storage pool of server(s) 102 as free space. The manner in which reclamation operations are performed may be specified by an SLA and/or an SMP. For example, an SMP may include parameters dictating when storage allocated to a first user/client/VM is obsolete and thus suitable for management as discussed above. The SMP may also include parameters specifying whether all or a portion of obsolete storage may be reclaimed as free space by cloud storage provider, which may be specified by the cloud storage user depending on the his/her goals. Provided those parameters are met, reclamation engine 204 may in response to storage management commands from policy enforcement module 205 cause cloud server(s) 102 to reclaim all or a portion of cloud storage 105 as free space, in accordance with a service level agreement and/or SMP.

As noted previously, cloud server(s) 102 may be configured to provide cloud storage 105 to a cloud storage user such as client 101 in association with one or more virtual machines, wherein each virtual machine may be allocated an initial (first) amount of the total storage pool allocated to a cloud storage user. In such instances, reclamation and/or reallocation operations may be performed by reclamation engine 204 by deleting one or more virtual machines at the host level, designating all or a portion of the first amount of storage from the deleted VM(s) as obsolete, and instantiating a new copy of the deleted VM's with an adjusted amount of storage corresponding to the first amount minus all or a part of the obsolete storage. The portion of the obsolete storage not included in the new copy of the VM may then be reclaimed as free space within cloud storage 105 and/or reallocated to at least one other client and/or virtual machine.

Alternatively or additionally, reclamation engine 204 may perform reclamation and/or reallocation operations on cloud storage 105 by deleting files and/or data objects from a first virtual machine, thus freeing storage within the first virtual machine. During or after such deletion, reclamation engine 204 may cause the first virtual machine to be migrated (e.g., non-destructively and/or non-disruptively) to another thinly provisioned storage space as a second virtual machine, without all or a portion of the free space in the first virtual machine. Once the migration is complete, the first virtual machine may be deleted and the resulting free space may be reclaimed and/or reallocated as discussed above.

Policy enforcement module (PEM) 205 may generally function to enforce one or more policies that govern or otherwise control the allocation of cloud storage 105 amongst one or more users, clients and/or virtual machines. For example, policy enforcement module 205 may store or otherwise be aware of the parameters of a service level agreement (SLA) between a cloud storage provider and cloud storage user (e.g., client 101), in which case it may function to ensure that the requirements of the SLA are met and/or maintained. Alternatively or additionally, PEM 205 may enforce storage management policy(ies) 206, which may govern the allocation of cloud storage 105 at the host, client and/or virtual machine level as discussed above.

As noted previously, PEM 205 may be configured to transmit sweep instigation signals to sweep engine 203. More specifically, PEM 205 when executed by a processor of a computing device (e.g., by client 101, cloud server(s) 102, and/or optional cloud storage manager 104) may cause the computing device to monitor for sweep instigation signals from SMM 201 or, more particularly, from scheduler module 202. In response to a sweep instigation signal, PEM 205 may determine which storage management policy(ies) 206 apply, and may transmit a sweep instigation signal (e.g., a modified version of a received sweep instigation signal) that identifies parameters relevant to such policy(ies) to sweep engine module 203. Such signals may be configured to cause sweep engine module 203 to perform an analysis sweep of cloud storage 105 for usage data and other information relevant to the pertinent storage management policies. Alternatively or additionally, in response to a sweep initiation signal PEM 205 may determine which storage management policy(ies) 206 apply, and may transmit a signal identifying parameters relevant to such policy(ies) to scheduler module 202. In response to such signals, scheduler module 202 may transmit a sweep instigation signal including the parameter provided by PEM 205 to reclamation engine 204.

PEM 205 may be further configured to monitor for the receipt of usage information signals from sweep engine module 203. As noted previously, usage information signals may contain usage information relevant to the storage management policy(ies) 206 and/or service level agreement(s) governing the cloud storage in question. In response to receiving a usage information signal, PEM 205 may analyze the received signal for relevant usage information, and may compare the received usage information against parameters specified in the relevant storage management control policy(ies) 206 and/or service level agreement(s). Based on this comparison, PEM 205 when executed by a processor of a computing device may cause the computing device to determine whether all or a portion of cloud storage 105 under consideration is obsolete and thus suitable for management (e.g., reallocation and/or reclamation), as discussed above.

If any or all of the cloud storage is obsolete, and provided the parameters of a relevant SLA and/or storage management policy(ies) 206 are met, PEM 205 (or a host computer system executing PEM 205) may transmit one or more storage management signals to storage management module or, more specifically, to reclamation engine 204. The storage management signals may be configured to cause reclamation engine 204 to perform storage management operations on relevant cloud storage 105 in accordance with pertinent storage management policy(ies) 206 and/or an overarching SLA. For example, the storage management signals may be configured to cause reclamation engine 204 to reclaim and/or reallocate all or a portion of storage containing data designated as obsolete, as generally discussed above.

In some embodiments, cloud storage 105 may be allocated amongst various clients and/or virtual machines. In such instances, PEM 205 may be configured as a hypervisor or supervisory module that manages cloud storage provisioned to multiple different clients and/or virtual machines. In some embodiments PEM 205 may be in communication with one or storage management modules 201 having purview over all or a portion of those clients and/or virtual machines. As a result, PEM 205 may be aware of the storage status of each client and/or virtual machine under its purview, and may allocate priority to certain (e.g., first) clients/virtual machines over other (e.g., second) virtual machines. For example, cloud storage 105 may be allocated between a relatively high priority first client and a relatively low priority second client.

Based upon usage information included in usage information signals received from one or more relevant sweep engine modules, PEM 205 may be aware of the storage condition of the first and second clients and/or virtual machines. When cloud storage for the first client/virtual machine becomes scarce (e.g., the free storage available to the first client/virtual machine falls below a predetermined free storage buffer), PEM 205 may cause a sweep engine module having purview over the second client/virtual machine to perform an analysis sweep on the second client and report usage information to PEM 205. PEM 205 may analyze the reported usage information and determine whether a portion of the storage allocated to the second client/virtual machine is obsolete. If so, PEM 205 when executed by a processor of a computing device may cause the computing device to send reallocation instructions to reclamation engine 204, wherein the instructions are configured to cause reclamation engine 204 to de-allocate the obsolete storage from the second client/virtual machine and reallocate the obsolete storage to the first client/virtual machine.

As further shown in FIG. 2, the technologies of the present disclosure may also include optional client user interface (UI) module 207 and optional registration module 208. As briefly discussed above, optional client UI module 207 may generally function to provide an interface through which a user may interact with one or more of the other modules discussed above. In this regard, optional client UI module 207 may be hosted or otherwise present on a client device, and may include computer readable instructions that when executed by a processor of the client device cause the client device to provide a user interface for interacting with one or more of storage management module 201, scheduler module 202, sweep engine module 203, reclamation engine 204, cloud storage 105, policy enforcement module 205, storage management policy(ies) 206, and/or optional registration module 208.

Optional client UI 207 may be configured in any suitable manner for this purpose. For example, client UI 207 may include instructions that when executed by a client device cause the client device to produce a user interface as part of a standalone application executed within the context of an operating system of the client device, as a web-based interface, combinations thereof and the like. Without limitation, optional client UI 207 is preferably configured to produce a web-based user interface.

In some embodiments, optional client UI 207 may be configured to permit a user to "opt in" to the cloud storage management technology described herein. For example, optional client UI 207 may allow a user to make inputs to optional registration module 208, which may generally track user opt-in (e.g., agreement with a cloud storage provider) to have cloud storage 105 managed in accordance with a relevant SLA and/or storage management policy(ies) 206.

Optional client UI 207 may also permit a user to configure scheduler module 202, as generally mentioned above. For example, client UI 207 may be configured to relay user inputs to scheduler module 202, so as to adjust the timing of sweep instigation signals and hence, the execution of sweeping operations and storage management operations described herein. In some embodiments, optional UI 207 may be configured to send on-demand signals to scheduler module 202. In response to such signals, scheduler module 202 may instigate an analysis sweep outside of a predetermined schedule and/or time. i.e., at the demand of a user.

For the sake of illustration, two exemplary systems for managing cloud storage will now be described, wherein the modules of FIG. 2 are hosted and executed on various devices to accomplish a method of managing cloud storage in accordance with the present disclosure and shown in FIG. 3. One example of the effects of such example systems and method to manage cloud storage is shown in FIG. 4. It should be understood that such examples are described for the sake of clarity and ease of understanding of the present disclosure only, and that other configurations and results are possible and contemplated.

In a first example, client 101 may host optional client UI 207, and one or more cloud server(s) 102 may host storage management module 201. PEM 205 and cloud storage 105. In this example, storage management module 201 includes scheduler module 202, sweep engine module 203, and reclamation engine 204, and PEM 205 includes storage management policy(ies) 206. In a second example, an optional cloud storage manager (e.g., CSM 104) is used and hosts PEM 205 and scheduler module 202, while sweep engine module 203 and reclamation engine module 204 remain on one or more cloud server(s) 102.

For clarity and ease of understanding, it is assumed for both examples that an SLA has caused a cloud service provider to allocate cloud storage 105 amongst three instances (e.g., virtual machines). This concept is illustrated in FIG. 4, which depict instances 401, 402, and 403 in their initial state as including the same amount of allocated storage, as well as a software layer (cross-hatched), used storage (hashed), and free storage (blank). The relative amount of free space on cloud storage 105 after the initial allocation to instances 401-403 is illustrated in FIG. 4 as free space 404.

Figure 3:
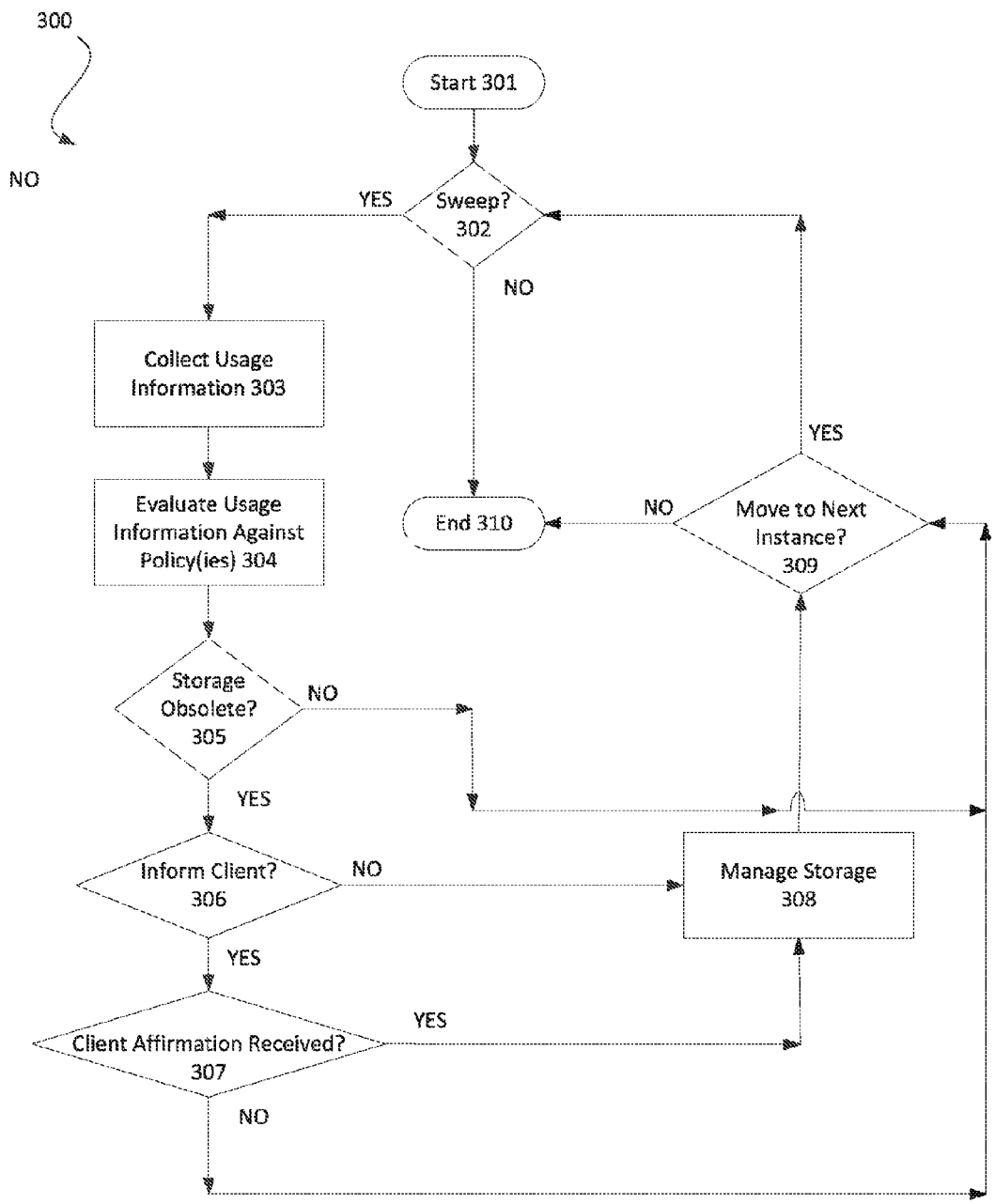
FIG. 3. is a flow diagram of an exemplary method of managing cloud storage, consistent with the present disclosure.
Figure 4:
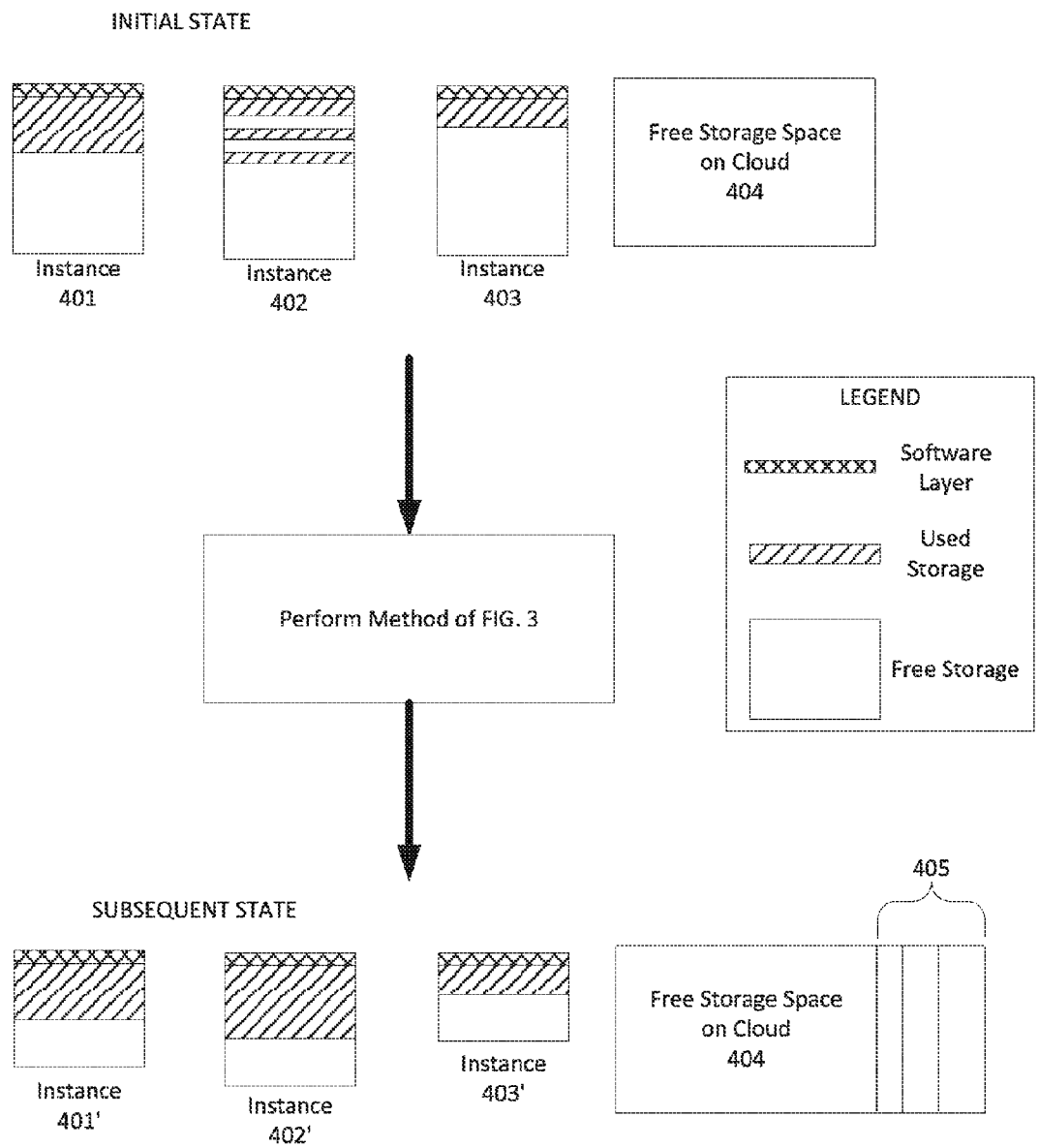
FIG. 4 is a block diagram of one example of managing cloud storage in accordance with the present disclosure.

Turning now to FIG. 3, an exemplary method of the present disclosure may begin at block 301. At block 302, a determination may be made as to whether an analysis sweep is to be performed. Consistent with the foregoing discussion, the decision of whether an analysis sweep is to be performed may be controlled by scheduler module 202 of SMM 201, by PEM 205, and/or by a user input through optional client UI 207. For example, scheduler module 202 may be configured to instigate an analysis sweep at a predetermined time, according to a schedule, etc. In such instances, scheduler module 202 may instigate an analysis sweep as previously described. Alternatively or additionally, PEM 205 may be aware that the amount of free space allocated to one or more of instances 401-403 has become scarce (e.g. from reports received from a hypervisor of instances 401-403). In such instance, PEM 205 may instigate an analysis sweep, particularly in instances where the instance with scarce resources is of higher priority than other instances. Still further, an analysis sweep may be instigated by an input made to scheduler 202 and/or PEM 205, e.g., via optional client UI 207.

If a sweep is not to be performed, the method may proceed to block 310 and end. If a sweep is to be performed, the method may proceed to block 303, whereupon PEM 205 and/or scheduler module 202 may instigate a storage sweeping operation. As noted previously. PEM 205 and/or scheduler module 202 may initiate a storage sweep by transmitting a sweep instigation message to sweep engine module 203. In examples where CSM 104 hosts scheduler module 202 and/or PEM 205, one or both of such modules may cause CSM 104 to transmit a sweep instigation message to sweep engine module 203, e.g., via a network such as network 103.

The method may then proceed to block 303, wherein usage information for an instance may be collected. As explained previously, usage information may be collected by sweep engine 203, which may sweep instances 401-403 as generally described above. Prior to execution of a sweep, PEM 205 and/or scheduler module 201 may transmit one or more signals to sweep engine module 203 to inform it of parameters contained in an SLA and/or a storage management policy governing the relevant instance. Sweep engine module 203 may then sweep instances 401-403 to obtain usage information correlating to the parameters of the storage management policy.

For example, PEM 205 may enforce a storage management policy applying to each of instances 401-403. For the sake of discussion, the policy in the foregoing examples may include parameters specifying that free space allocated to instances 401-403 is obsolete and may be reclaimed if it is greater than 50% of the storage allocated to a particular instance in the initial state is not used. The storage management policy and/or a relevant SLA may also require each of instances 401-403 to maintain a free storage buffer equal to 10% of the storage initially allocated to each instance. With these parameters in mind, sweep engine module 203 may sweep instances 401-403 to determine the total amount of storage allocated to each instance, and the total amount of free storage available in each instance. Sweep engine module 203 may then report this usage information to policy enforcement module 205.

The method may then proceed to block 304, wherein the usage information reported by sweep engine module is evaluated against the parameters of a relevant SLA and/or storage management policy(ies). As discussed above, evaluation of the usage information in this manner may be performed by PEM 205, and may be done on an instance by instance basis. Pursuant to block 305, a determination may be made as to whether any storage allocated to an instance under consideration is obsolete, as discussed above. If not, the method may proceed to block 309, wherein a determination may be made (e.g., by PEM 205) as to whether evaluation is to proceed to the next instance. If so, the method may proceed back to block 302.

If all or a portion of storage allocated to instances 401-403 is determined to be obsolete, the method may proceed to block 306, wherein a determination may be made as to whether it is necessary to inform a relevant client. In this regard, a storage management policy and/or an SLA governing one or more of instances 401-403 may require confirmation by a client that management of storage identified as obsolete is acceptable. If confirmation from a client is needed, a client confirmation message may be sent to a relevant client, such as a client having access to the instance under consideration. The client confirmation message may be sent, for example, by PEM 205, storage management module 201, and/or a computing system executing one or more of such modules. Without limitation, client confirmation messages are preferably transmitted by PEM 205 or a computing system executing PEM 205.

Regardless, a client confirmation message may include information that may be of interest to a user in evaluating whether management of cloud storage is desired. For example, a client confirmation message may include information regarding the amount: in which obsolete storage would be managed (e.g., reallocated and/or reclaimed); of storage that would remain allocated to an instance after management; of time for which an original amount of storage allocated to instance would be unavailable; of time required to manage the storage in the manner indicated; amount of money that may be saved if the storage is managed in the indicated fashion; combinations thereof, and the like.

The method may then proceed to block 307, wherein a determination may be made as to whether client affirmation has been received. In this regard, PEM 205 may be configured (or when executed by a computing device may cause the computing device) to monitor for the receipt of a client affirmation message. The client affirmation message may originate from a client of a user (e.g., client 101), and may be sent in response to inputs made to the client, e.g., via optional client UI 207. If a client affirmation message is not received (or not received within a specified time period), the method may proceed to block 309. If a client affirmation message is received however (or if it is not necessary to inform a client pursuant to block 306), the method may proceed to block 308, wherein storage allocated to the instance under consideration may be managed in the manner indicated.

Applying the policies described above (i.e., an SLA requiring a 10% free storage buffer, and a storage management policy indicating that free storage allocated to an instance is obsolete and may be reclaimed if greater than 50% of the storage allocated to an instance is free), pursuant to blocks 304 and 305, PEM 205 may determine that free storage among the storage allocated to instance 401 is obsolete. That is, usage information reported to PEM 205 from sweeping engine module 203 may indicate that greater than 50% of the storage allocated to instance 401 is free. Applying the foregoing policies. PEM 205 may pursuant to block 305 determine that the free storage allocated to such instance is obsolete. Assuming that no client affirmation is required (or client affirmation has been received), PEM 205 may pursuant to block 308 instruction a reclamation engine (e.g., reclamation engine module 208) to manage the storage allocated to instance 401 in accordance with the SLA and storage management policy(ies). In this case, PEM 205 may instruct reclamation engine module 208 to reclaim 40% of the free storage allocated to instance 401 and reallocate such storage to the free storage space 401 provided by a cloud storage provider.

The method may then proceed to block 309 and repeat for each instance, or it may end at block 310. In the example of FIG. 4, each iteration of the method of FIG. 3 resulted in the identification of obsolete storage in at least one of instances 401, 402, and 403. Pursuant to block 308, PEM 205 instructed a reclamation engine module 204 to reclaim the obsolete storage and reallocate it to the free storage of a cloud storage provider. Therefore upon completion of the method of FIG. 3 for each instance, the subsequent state of each instance (shown in FIG. 4 as instances 401', 402', 403') will remain, but will have less storage allocated to it. For example, each of instances 401', 402' and 403' may include free storage in the amount of 10% (or more) of the initial storage amount allocated to each instance, as specified by the relevant SLA governing each instance. Obsolete storage 405 trimmed from instances 401-403 is reallocated in the subsequent state to free storage space 404, as shown.

As discussed above, the technologies of the present disclosure may provide a mechanism for dynamically managing cloud storage using one or more policies. In this way, effective control over cloud storage may be obtained by managing and/or configuring policies covering allocated cloud storage, which may the be enforced automatically and/or on demand so as to obtain an efficient or otherwise desirable allocation of storage resources, while limiting or eliminating costly and/or time consuming manual management of storage. The technology described herein may also allow cloud storage providers to improve capacity management by increasing utilization through reallocation and/or reclamation processes.

EXAMPLES

Examples of the present disclosure include subject material such as a method, means for performing acts of the method, a device, at least one machine-readable medium including instructions that when performed by a machine cause the machine to perform acts of the method, and of an apparatus or system for hardening the security of digital information and assets that may be used to access digital information on a client device, as discussed below.

Example 1

According to this example there is provided a cloud storage management system including a policy enforcement module and a storage management module configured to analyze storage allocated to at least one first storage pool of a general cloud storage pool to determine usage information regarding the first storage pool and to report the usage information to the policy enforcement module; wherein: the policy enforcement module is configured to enforce a storage management policy governing the management of storage allocated to the first storage pool, the storage management policy comprising at least one first parameter for determining whether at least a portion of the first storage pool is obsolete; the policy enforcement module is further configured to issue a storage management command to the storage management module, the storage management command instructing the storage management module to manage obsolete storage of the first storage pool by reclaiming at least a portion of the obsolete storage as free space of the general cloud storage pool, reallocating at least a portion of the obsolete storage to at least one second storage pool allocated from the general cloud storage pool, or a combination thereof; and the storage management module is configured to manage the obsolete storage in accordance with the storage management command.

Example 2

This example includes the elements of example 1, wherein the cloud storage is virtualized in accordance with a service level agreement into a plurality of storage pools including at least the first storage pool and the second storage pool.

Example 3

This example includes the elements of example 1, wherein the first storage pool is allocated to a first virtual machine and the second storage pool is allocated to a second virtual machine.

Example 4

This example includes the elements of example 1, wherein the at least one first parameter includes at least one of a free storage allocation threshold for the first storage pool, a free storage buffer for the first storage pool, an expiration date for storage of the first storage pool, one or more indicator flags pertaining to data stored in the first storage pool; a minimum dormant usage threshold for data stored in the first storage pool; a threshold access limit for data stored in the first storage pool; a cost savings threshold based on monetary savings achieved that may be achieved by management of the first storage pool; authorship information pertaining to data stored in the first storage pool; and combinations thereof.

Example 5

This example includes the elements of example 1, wherein the policy enforcement module is configured to designate at least a portion of the first storage pool as obsolete if usage information indicates that the at least one first parameter is met.

Example 6

This example includes the elements of any one of examples 1-5, wherein the policy enforcement module further includes at least one second parameter to override the designation of at least a portion of the first storage pool as obsolete if the at least one second parameter is met.

Example 7

This example includes the elements of example 6, wherein the at least one second parameter includes a service level agreement override configured to cause the policy enforcement module to override the designation of at least a portion the first storage pool as obsolete if management of the first storage pool would result in non-compliance with one or more factors of a service level agreement governing the first storage pool.

Example 8

This example includes the elements of example 7, wherein the one or more factors of the service level agreement include a minimum storage allocation for the first storage pool, a minimum free storage threshold for the first storage pool, and combinations thereof.

Example 9

This example includes the elements of example 6, wherein the at least one second parameter includes a data importance override configured to cause the policy enforcement module to override the designation of at least a portion the first storage pool as obsolete if management of the first storage pool would result in reclamation of storage containing data bearing an indicator of high importance, reallocation of storage containing data bearing an indicator of high importance, or a combination thereof.

Example 10

This example includes the elements of example 6, wherein the at least one second parameter includes a cost savings override configured to cause the policy enforcement module to override the designation of at least a portion of the first storage pool as obsolete if management of the first storage pool would fail to meet a predetermined cost savings threshold.

Example 11

This example includes the elements of example 5, and further includes at least a third parameter to control the manner in which obsolete storage of the first storage pool is managed.

Example 12

This example includes the elements of example 11, wherein the third parameter is configured to cause the policy enforcement module to reallocate at least a portion of the obsolete storage to the second storage pool, reclaim at least a portion of the obsolete storage to the general cloud storage pool, or a combination thereof.

Example 13

This example includes the elements of example 11, wherein the third parameter is configured to cause the policy enforcement module to reallocate at least a portion of the obsolete storage among a plurality of storage pools including at least the second storage pool and storage pools other than the second storage pool, wherein the policy enforcement module is configured to prioritize the reallocation of the obsolete storage to one or more of the second storage pool and the storage pools other than the second storage pool.

Example 14

This example includes the elements of example 1, wherein the policy enforcement module is further configured to: determine an impact of a proposed management of obsolete storage; report the impact to a client user interface module; in response to receipt of a client affirmation message from the client interface module, instruct the storage management module to manage the obsolete storage in accordance with the proposed management.

Example 15

This example includes the elements of example 1, and further includes a scheduler module, the scheduler module to schedule the performance of analysis sweeps on the first storage pool by the storage management module to determine the usage information.

Example 16

This example includes the elements of example 15, wherein the scheduler module is configured to instigate the performance of the analysis sweeps by sending a sweep instigation message, the sweep instigation message comprising information regarding the first parameter of the storage management policy.

Example 17

This example includes the elements of example 16, wherein in response to the sweep instigation message, the storage management module performs an analysis sweep on the first storage pool to determine usage information relevant to the first parameter.

Example 18

This example includes the elements of example 16, wherein the sweep instigation message is sent from the scheduler module to the policy enforcement module, wherein in response to receiving the sweep instigation message the policy enforcement module produces a modified sweep instigation message include information regarding the first parameter, and sends the modified sweep instigation message to the storage management module.

Example 19

This example includes the elements of example 16, wherein the scheduler module is configurable by the policy engine module, by inputs received from a client user interface, or a combination thereof.

Example 20

This example includes the elements of example 19, wherein the policy enforcement module includes at least one scheduling parameter and is operable to configure the scheduler module to transmit the sweep instigation message in accordance with the scheduling parameter.

Example 21

This example includes the elements of example 18, wherein in response to the modified sweep instigation message, the storage management module performs an analysis sweep on the first storage pool to determine usage information relevant to the first parameter.

Example 22

This example includes the elements of example 1, wherein the first storage pool is allocated to an initial instantiation of a first virtual machine, and the storage management module is configured to manage the obsolete storage by deleting the initial instantiation of the first virtual machine, designating at least a portion of the obsolete storage as unallocated free space, producing a subsequent instantiation of the first virtual machine, the subsequent instantiation being allocated a modified first storage pool that does not include at least part of the unallocated free space.

Example 23

This example includes the elements of example 22, wherein the storage management module is further configured to reallocate at least part of the unallocated free space to the second data storage pool, to reclaim at least part of the unallocated free space to the general cloud storage pool, or a combination thereof.

Example 24

This example includes the elements of any one of examples 1 to 5 and 11 to 23, wherein the first storage pool is allocated to a first virtual machine and the second storage pool is allocated to a second virtual machine, wherein the storage management module manages the obsolete storage by deleting data contained in the obsolete storage to produce unallocated free space and a modified first storage pool not including the unallocated free space, migrating the first virtual machine to a thinly provisioned storage space in the general cloud storage pool to produce a modified first virtual machine having the modified first storage pool allocated thereto, and deleting the first virtual machine.

Example 25

This example includes the elements of example 24, wherein the storage management module is further configured to reallocate at least a portion of the unallocated free space to the second storage pool, to reclaim at least a portion of the unallocated free space to the general cloud storage pool, or a combination thereof.

Example 26

This example includes the elements of example 1, and further includes at least one server device comprising the policy enforcement module, storage management module, general cloud storage pool, first storage pool, the second storage pool.

Example 27

This example includes the elements of example 26, and further includes at least one client device comprising a client user interface module configured to interface with at least one of the policy enforcement module, storage management module, general cloud storage pool, first storage pool, and second storage pool.

Example 28

This example includes the elements of example 1, and further includes a cloud storage management device comprising the policy enforcement module and at least one server device comprising the storage management module, general cloud storage pool, first storage pool, the second storage pool.

Example 29

This example includes the elements of example 1, wherein the first and second storage pools are allocated to first and second virtual machines, respectively, the cloud storage management system further includes a hypervisor comprising at least one of the policy enforcement module and the storage management module, the hypervisor controlling at least one of the first and second storage pools.

Example 30

In this example there is provided a method of managing cloud storage comprising at least a first storage pool and at least one general cloud storage pool, the method including: collecting usage information from the first storage pool, the usage information indicative of the use of storage within the first storage pool; determining whether any portion of the first storage pool is obsolete storage by evaluating the usage information against parameters specified by at least one policy governing the first storage pool; if any portion of the first storage pool is obsolete storage, managing the obsolete storage by reallocating at least a portion of the obsolete storage to a second storage pool allocated from the general could storage pool, reclaiming at least a portion of the obsolete storage to the general cloud storage pool, or a combination thereof.

Example 31

This example includes the elements of example 30, wherein the at least one policy includes a service level agreement, and the cloud storage is virtualized in accordance with the service level agreement into a plurality of storage pools including at least the first storage pool and the second storage pool.

Example 32

This example includes the elements of example 30, wherein the first storage pool is allocated to a first virtual machine and the second storage pool is allocated to a second virtual machine.

Example 33

This example includes the elements of example 30, wherein the at least one policy governing the first storage pool includes a storage management policy, the storage management policy comprising at least one first parameter for determining whether any portion of the first storage pool is obsolete storage, wherein if the usage information indicates that the at least one first parameter is met for an analyzed portion of the first storage pool, the method further includes designating the analyzed portion as obsolete storage.

Example 34

This example includes the elements of example 33, wherein the at least one first parameter includes at least one of a free storage allocation threshold for the first storage pool, a free storage buffer for the first storage pool, an expiration date for storage of the first storage pool, one or more indicator flags pertaining to data stored in the first storage pool; a minimum dormant usage threshold for data stored in the first storage pool; a threshold access limit for data stored in the first storage pool; a cost savings threshold based on monetary savings achieved that may be achieved by management of the first storage pool; authorship information pertaining to data stored in the first storage pool; and combinations thereof.

Example 35

This example includes the elements of example 33, and further includes enforcing at least one second parameter of the at least one policy to override a designation of at least a portion of the first storage pool as obsolete storage if the at least one second parameter is met.

Example 36

This example includes the elements of example 35, wherein the at least one policy further includes a service level agreement governing the first storage pool, and the at least one second parameter includes a service level agreement override to override the designation of at least a portion the first storage pool as obsolete managing the first storage pool would result in non-compliance with one or more factors of the service level agreement.

Example 37

This example includes the elements of example 36, wherein the one or more factors of the service level agreement include a minimum storage allocation for the first storage pool, a minimum free storage threshold for the first storage pool, and combinations thereof.

Example 38

This example includes the elements of example 35, wherein the at least one second parameter includes a data importance override to override the designation of at least a portion the first storage pool as obsolete if management of the first storage pool would result in reclamation of storage containing data bearing an indicator of high importance, reallocation of storage containing data bearing an indicator of high importance, or a combination thereof.

Example 39

This example includes the elements of example 35, wherein the at least one second parameter includes a cost savings override configured to override the designation of at least a portion of the first storage pool as obsolete if management of the first storage pool would fail to meet a predetermined cost savings threshold.

Example 40

This example includes the elements of example 34, and further includes enforcing a third parameter of the at least one policy to control the manner in which obsolete storage of the first storage pool is managed.

Example 41

This example includes the elements of example 40, wherein enforcement of the third parameter causes reallocation at least a portion of the obsolete storage to the second storage pool, reclamation of at least a portion of the obsolete storage to the general cloud storage pool, or a combination thereof.

Example 42

This example includes the elements of example 40, wherein enforcement of the third parameter causes reallocation of at least a portion of the obsolete storage among a plurality of storage pools including at least the second storage pool and storage pools other than the second storage pool, the method further comprising prioritizing reallocation of the obsolete storage to one or more of the second storage pool and the storage pools other than the second storage pool.

Example 43

This example includes the elements of any one of examples 30 to 42, and further includes: determining an impact of a proposed management of obsolete storage; reporting the impact to a client user interface module; and in response to a client affirmation message from the client interface module, managing the obsolete storage in accordance with the proposed management.

Example 44

This example includes the elements of example 43, wherein the collecting usage information includes performing an analysis sweep on the first storage pool.

Example 45

This example includes the elements of example 44, and further includes instigating the performance of the analysis sweep with a sweep instigation message, the sweep instigation message comprising information regarding the at least one first parameter of the storage management policy.

Example 46

This example includes the elements of example 45, wherein the collecting usage information includes performing the analysis sweep on the first storage pool to determine usage information relevant to the at least one first parameter.

Example 47

This example includes the elements of example 44, and further includes scheduling the analysis sweep based on scheduling parameters of the at least one policy, user inputs, or a combination thereof.

Example 48

This example includes the elements of example 30, wherein the first storage pool is allocated to an initial instantiation of a first virtual machine, and the managing obsolete storage includes deleting the initial instantiation of the first virtual machine, designating at least a portion of the obsolete storage as unallocated free space, and producing a subsequent instantiation of the first virtual machine that is allocated a modified first storage pool that does not include at least part of the unallocated free space.

Example 49

This example includes the elements of example 48, wherein managing the obsolete storage further includes reallocating at least part of the unallocated free space to the second data storage pool, reclaiming at least part of the unallocated free space to the general cloud storage pool, or a combination thereof.

Example 50

This example includes the elements of example 49, wherein the first storage pool is allocated to a first virtual machine and the second storage pool is allocated to a second virtual machine, wherein the managing obsolete storage includes deleting data contained in the obsolete storage to produce unallocated free space and a modified first storage pool not including the unallocated free space, migrating the first virtual machine to a thinly provisioned storage space in the general cloud storage pool to produce a modified first virtual machine having the modified first storage pool allocated thereto, and deleting the first virtual machine.

Example 51

This example includes the elements of example 50, and further includes reallocating at least a portion of the unallocated free space to the second storage pool, reclaiming at least a portion of the unallocated free space to the general cloud storage pool, or a combination thereof.

Example 52

This example includes the elements of any one of examples 30 to 42 and 48 to 51 wherein the cloud storage, first storage pool, second storage pool, and at least one policy are hosted by at least one server device.

Example 53

This example includes the elements of example 33, wherein the first and second storage pools are allocated to first and second virtual machines, respectively, and the method further includes enforcing the at least one policy with a hypervisor controlling at least one of the first and second storage pools.

Example 54

According to this example there is provided at least one machine readable storage medium having stored thereon, individually or in combination, instructions that when executed by at least one processor result in the following operations including: collecting usage information from a first storage pool of a cloud storage further comprising at least one general cloud storage pool, the usage information indicative of the use of storage within the first storage pool; determining whether any portion of the first storage pool is obsolete storage by evaluating the usage information against parameters specified by at least one policy governing the first storage pool; if any portion of the first storage pool is obsolete storage, managing the obsolete storage by reallocating at least a portion of the obsolete storage to a second storage pool allocated from the general could storage pool, reclaiming at least a portion of the obsolete storage to the general cloud storage pool, or a combination thereof.

Example 55

This example includes the elements of example 54, wherein the at least one policy includes a service level agreement, and the cloud storage is virtualized in accordance with the service level agreement into a plurality of storage pools including at least the first storage pool and the second storage pool.

Example 56

This example includes the elements of example 54, wherein the first storage pool is allocated to a first virtual machine and the second storage pool is allocated to a second virtual machine.

Example 57

This example includes the elements of example 54, wherein the at least one policy governing the first storage pool includes a storage management policy, the storage management policy comprising at least one first parameter for determining whether any portion of the first storage pool is obsolete storage, wherein the instructions when executed further result in the following operations comprising: designating the analyzed portion as obsolete storage if the usage information indicates that the at least one first parameter is met for an analyzed portion of the first storage pool.

Example 58

This example includes the elements of example 57, wherein the at least one first parameter includes at least one of a free storage allocation threshold for the first storage pool, a free storage buffer for the first storage pool, an expiration date for storage of the first storage pool, one or more indicator flags pertaining to data stored in the first storage pool; a minimum dormant usage threshold for data stored in the first storage pool; a threshold access limit for data stored in the first storage pool; a cost savings threshold based on monetary savings achieved that may be achieved by management of the first storage pool; authorship information pertaining to data stored in the first storage pool; and combinations thereof.

Example 59

This example includes the elements of example 57, wherein the instructions when executed further result in the following operations comprising: enforcing at least one second parameter of the at least one policy to override a designation of at least a portion of the first storage pool as obsolete storage if the at least one second parameter is met.

Example 60

This example includes the elements of example 59, wherein the at least one policy further includes a service level agreement governing the first storage pool, and the at least one second parameter includes a service level agreement override to override the designation of at least a portion the first storage pool as obsolete managing the first storage pool would result in non-compliance with one or more factors of the service level agreement.

Example 61

This example includes the elements of example 60, wherein the one or more factors of the service level agreement include a minimum storage allocation for the first storage pool, a minimum free storage threshold for the first storage pool, and combinations thereof.

Example 62

This example includes the elements of example 35, wherein the at least one second parameter includes a data importance override to override the designation of at least a portion the first storage pool as obsolete if management of the first storage pool would result in reclamation of storage containing data bearing an indicator of high importance, reallocation of storage containing data bearing an indicator of high importance, or a combination thereof.

Example 63

This example includes the elements of example 59, wherein the at least one second parameter includes a cost savings override configured to override the designation of at least a portion of the first storage pool as obsolete if management of the first storage pool would fail to meet a predetermined cost savings threshold.

Example 64

This example includes the elements of example 58, wherein the instructions when executed further result in the following operations including: enforcing a third parameter of the at least one policy to control the manner in which obsolete storage of the first storage pool is managed.

Example 65

This example includes the elements of example 64, wherein enforcement of the third parameter causes reallocation at least a portion of the obsolete storage to the second storage pool, reclamation of at least a portion of the obsolete storage to the general cloud storage pool, or a combination thereof.

Example 66

This example includes the elements of example 64, wherein enforcement of the third parameter causes reallocation of at least a portion of the obsolete storage among a plurality of storage pools including at least the second storage pool and storage pools other than the second storage pool, the method further comprising prioritizing reallocation of the obsolete storage to one or more of the second storage pool and the storage pools other than the second storage pool.

Example 67

This example includes the elements of any one of examples 54 to 66, wherein the instructions when executed further result in the following operations including: determining an impact of a proposed management of obsolete storage; reporting the impact to a client user interface module; and in response to a client affirmation message from the client interface module, managing the obsolete storage in accordance with the proposed management.

Example 68

This example includes the elements of example 57, wherein the collecting usage information includes performing an analysis sweep on the first storage pool.

Example 69

This example includes the elements of example 68, wherein the instructions when executed further result in the following operations comprising: instigating the performance of the analysis sweep with a sweep instigation message, the sweep instigation message comprising information regarding the at least one first parameter of the storage management policy.

Example 70

This example includes the elements of example 69, wherein the collecting usage information includes performing the analysis sweep on the first storage pool to determine usage information relevant to the at least one first parameter.

Example 71

This example includes the elements of example 68, and further includes scheduling the analysis sweep based on scheduling parameters of the at least one policy, user inputs, or a combination thereof.

Example 72

This example includes the elements of example 54, wherein the first storage pool is allocated to an initial instantiation of a first virtual machine, and the managing obsolete storage includes deleting the initial instantiation of the first virtual machine, designating at least a portion of the obsolete storage as unallocated free space, and producing a subsequent instantiation of the first virtual machine that is allocated a modified first storage pool that does not include at least part of the unallocated free space.

Example 73

This example includes the elements of example 72, wherein managing the obsolete storage further includes reallocating at least part of the unallocated free space to the second data storage pool, reclaiming at least part of the unallocated free space to the general cloud storage pool, or a combination thereof.

Example 74

This example includes the elements of example 73, wherein the first storage pool is allocated to a first virtual machine and the second storage pool is allocated to a second virtual machine, and wherein the managing obsolete storage includes deleting data contained in the obsolete storage to produce unallocated free space and a modified first storage pool not including the unallocated free space, migrating the first virtual machine to a thinly provisioned storage space in the general cloud storage pool to produce a modified first virtual machine having the modified first storage pool allocated thereto, and deleting the first virtual machine.

Example 75

This example includes the elements of example 74, wherein the managing obsolete storage further includes reallocating at least a portion of the unallocated free space to the second storage pool, reclaiming at least a portion of the unallocated free space to the general cloud storage pool, or a combination thereof.

Example 76

This example includes the elements of any one of examples 54 to 66 and 68 to 75, wherein the cloud storage, first storage pool, second storage pool, and at least one policy are hosted by at least one server device.

Example 77

This example includes the elements of example 57, wherein the first and second storage pools are allocated to first and second virtual machines, respectively, and the instructions when executed further result in the following operations comprising: enforcing the at least one policy with a hypervisor controlling at least one of the first and second storage pools.

Example 78

According to this example there is provided a system arranged to perform the method of any one of examples 30-53.

Example 79

According to this example there is provided a device including means to perform the method of any one of examples 30-53.

Example 80

According to this example there is provided at least one machine readable medium comprising a plurality of instructions that, in response to being executed on a computing device, cause the computing device to perform the method according to any one of examples 30-53.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications

What is claimed is:

1. A cloud storage management system including at least one processor comprising:
storage management circuitry for managing a plurality of storage pools collectively forming a general cloud storage pool in a cloud computing network, the storage management circuitry to:
determine usage information regarding a first storage pool, the usage information at least representing an amount of storage allocated to the first storage pool, an amount of the allocated storage that is available, and an amount of the allocated storage that is unavailable; and report the usage information to policy enforcement circuitry, the policy enforcement circuitry to:

enforce a storage management policy governing the management of the storage allocated to the first storage pool, the storage management policy determining when a portion of the allocated storage that is available is obsolete and when a portion of the allocated storage that is unavailable is obsolete based, at least in part, on one or more first parameters, wherein the one or more first parameters include at least one of an expiration date for the allocated storage, a free storage allocation threshold, a free storage buffer threshold, a cost savings threshold, a minimum dormant usage threshold for data stored in the first storage pool, an indicator flag indicating an importance of data stored in the first storage pool, a threshold access limit for data stored in the first storage pool, or authorship information of data stored in the first storage pool; and issue a storage management command to the storage management circuitry, the storage management command to cause the storage management circuitry to reclaim at least a portion of the allocated storage determined to be obsolete as free space for use in the general cloud storage pool reallocate, at least a portion of the allocated storage determined to be obsolete to one or more additional storage pools, or a combination thereof.

2. The cloud storage management system of claim 1, wherein the policy enforcement circuitry further includes a second parameter to override the determination that least a portion of the allocated storage is obsolete if the second parameter is met, wherein the second parameter includes a service level agreement override configured to cause the policy enforcement circuitry to override the determination that at least a portion of the allocated storage is obsolete if management of the first storage pool would result in non-compliance with one or more factors of a service level agreement governing the first storage pool.

3. The cloud storage management system of claim 2, wherein the one or more factors of the service level agreement include a minimum storage allocation for the first storage pool, a minimum free storage threshold for the first storage pool, and combinations thereof.

4. The cloud storage management system of claim 1, wherein the policy enforcement circuitry is further configured to:

determine an impact of a proposed management of obsolete storage;

report the impact to client user interface circuitry;

in response to receipt of a client affirmation message from the client interface circuitry, instruct the storage management circuitry to manage the obsolete storage in accordance with the proposed management of the allocated storage determined to be obsolete.

5. The cloud storage management system of claim 1, further comprising scheduler circuitry, wherein the scheduler circuitry is configured to instigate analysis sweeps on the first storage pool by sending a sweep instigation message comprising information regarding the first parameter of the storage management policy; and in response to the sweep instigation message, the storage management circuitry performs an analysis sweep on the first storage pool to determine usage information relevant to the first parameter.

6. The cloud storage management system of claim 1, wherein the first storage pool is allocated to an initial instantiation of a first virtual machine, and the storage management circuitry is configured to manage the allocated storage determined to be obsolete by deleting the initial instantiation of the first virtual machine, designating at least a portion of the allocated storage determined to be obsolete as unallocated free space, producing a subsequent instantiation of the first virtual machine, the subsequent instantiation being allocated a modified first storage pool that does not include at least part of the unallocated free space.

7. The cloud storage management system of claim 1, wherein the first and one or more additional storage pools are allocated to respective virtual machines and the cloud storage management system further includes a hypervisor comprising at least one of the policy enforcement circuitry and the storage management circuitry, the hypervisor controlling at least one of the first or one or more of the additional storage pools.

8. A method of managing a plurality of storage pools collectively forming a general cloud storage pool in a cloud computing network, the method comprising:

collecting, by storage management circuitry, usage information from a first storage pool, the usage information at least representing an amount of storage allocated to the first storage pool, an amount of the allocated storage that is available, and an amount of the allocated storage that is unavailable;

determining, by policy enforcement circuitry, when a portion of the allocated storage that is available is obsolete and when a portion of the allocated storage that is unavailable is obsolete based, at least in part, on one or more first parameters, wherein the one or more first parameters include at least one of an expiration date for the allocated storage, a free storage allocation threshold, a free storage buffer threshold, a cost savings threshold, a minimum dormant usage threshold for data stored in the first storage pool, an indicator flag indicating an importance of data stored in the first storage pool, a threshold access limit for data stored in the first storage pool, or authorship information of data stored in the first storage pool; and when at least a portion of the allocated storage is determined to be obsolete, causing the storage management circuitry to reallocate at least a portion of the allocated storage that is determined to be obsolete to one or more additional storage pools, to reclaim at least a portion of the allocated storage that is determined to be obsolete as free space for use in the general cloud storage pool, or a combination thereof.

9. The method of claim 8, wherein the at least one policy includes a service level agreement, and the general cloud storage pool is virtualized in accordance with the service level agreement into the plurality of storage pools.

10. The method of claim 8, wherein the at least one policy further includes a service level agreement governing the first storage pool, the method further comprising enforcing at least one second parameter of the service level agreement to override the determination that at least a portion of the allocated storage is obsolete if managing the first storage pool would result in non-compliance with one or more factors of the service level agreement.

11. The method of claim 8, further comprising:

determining, by the policy enforcement circuitry, an impact of a proposed management of obsolete storage;

reporting, by the policy enforcement circuitry, the impact to a client user interface circuitry; and in response to a client affirmation message from the client interface circuitry, causing, by the policy enforcement circuitry, the storage management circuitry to manage the allocated storage determined to be obsolete in accordance with the proposed management of the obsolete storage.

12. The method of claim 8, wherein the collecting usage information includes performing an analysis sweep on the first storage pool.

13. The method of claim 8, wherein the first and one or more additional storage pools are allocated to respective virtual machines and the method further includes enforcing the at least one policy with a hypervisor controlling at least one of the first or one or more of the additional storage pools.

14. One or more non-transitory computer readable memories having stored thereon, individually or in combination, instructions that when executed by at least one processor result in the following operations comprising:
   collecting, by storage management circuitry, usage information from a first storage pool, the usage information at least representing an amount of storage allocated to the first storage pool, an amount of the allocated storage that is available, and an amount of the allocated storage that is unavailable;
   determining, by policy enforcement circuitry, when a portion of the allocated storage that is available is obsolete and when a portion of the allocated storage that is unavailable is obsolete based, at least in part, on one or more first parameters, wherein the one or more first parameters include at least one of an expiration date for the allocated storage, a free storage allocation threshold, a free storage buffer threshold, a cost savings threshold, a minimum dormant usage threshold for data stored in the first storage pool, an indicator flag indicating an importance of data stored in the first storage pool, a threshold access limit for data stored in the first storage pool, or authorship information of data stored in the first storage pool;
   when at least a portion of the allocated storage is determined to be obsolete, causing the storage management circuitry to reallocate at least a portion of the allocated storage that is determined to be obsolete to one or more additional storage pools, to reclaim at least a portion of the allocated storage that is determined to be obsolete as free space for use in a general cloud storage pool, or a combination thereof.

15. The one or more non-transitory computer readable memories of claim 14, wherein the at least one policy includes a service level agreement, and the general cloud storage pool is virtualized in accordance with the service level agreement into a plurality of storage pools including at least the first storage pool and the one or more additional storage pools.

16. The one or more non-transitory computer readable memories of claim 15, wherein the at least one policy further includes a service level agreement governing the first storage pool, the method further comprising enforcing at least one second parameter of the service level agreement to override the determination that at least a portion the allocated storage is obsolete if managing the first storage pool would result in non-compliance with one or more factors of the service level agreement.

17. The one or more non-transitory computer readable memories of claim 14, further comprising:
   determining, by the policy management circuitry, an impact of a proposed management of obsolete storage;
   reporting, by the policy enforcement circuitry, the impact to a client user interface circuitry; and
   in response to a client affirmation message from the client interface circuitry, causing, by the policy enforcement circuitry, the storage management circuitry to manage the allocated storage determined to be obsolete in accordance with the proposed management of the obsolete storage.

18. The one or more non-transitory computer readable memories of claim 14, wherein the collecting usage information includes performing an analysis sweep on the first storage pool.

19. The one or more non-transitory computer readable memories of claim 14, wherein the first and one or more additional storage pools are allocated to respective virtual machines and the method further includes enforcing the at least one policy with a hypervisor controlling at least one of the first or one or more of the additional storage pools.

* * * * *